(12) United States Patent
Aguilar et al.

(10) Patent No.: US 6,199,137 B1
(45) Date of Patent: Mar. 6, 2001

(54) METHOD AND DEVICE FOR CONTROLLING DATA FLOW THROUGH AN IO CONTROLLER

(75) Inventors: Raul A. Aguilar, Hellertown; Kevin Joseph Lynch, Slatington; James Thomas Clee, Orefield; James Edward Guziak, Laurys Station; Farrukh Amjad Latif, Lansdale, all of PA (US)

(73) Assignee: Lucent Technolgies, Inc., Murray Hill, NJ (US)

( * ) Notice: Subject to any disclaimer, the term of this patent is extended or adjusted under 35 U.S.C. 154(b) by 0 days.

(21) Appl. No.: 09/477,591

(22) Filed: Jan. 4, 2000

Related U.S. Application Data

(60) Provisional application No. 60/114,771, filed on Jan. 5, 1999, provisional application No. 60/114,772, filed on Jan. 5, 1999, and provisional application No. 60/114,767, filed on Jan. 6, 1999.

(51) Int. Cl.$^7$ ....................................................... G06F 13/40
(52) U.S. Cl. .............................. 710/129; 710/29; 710/37; 710/10
(58) Field of Search ................................... 710/8, 10, 11, 710/16, 36, 29, 37, 42, 101–103, 105, 128, 129

(56) References Cited

U.S. PATENT DOCUMENTS

| | | | |
|---|---|---|---|
| 5,671,441 | * | 9/1997 | Glassen et al. ......................... 710/8 |
| 5,815,731 | * | 9/1998 | Doyle et al. ......................... 710/10 |
| 5,892,928 | * | 4/1999 | Wallach et al. ....................... 710/103 |
| 5,935,228 | * | 8/1999 | Shinomura ........................... 710/102 |
| 5,964,852 | * | 10/1999 | Overton ................................ 710/62 |
| 6,003,097 | * | 12/1999 | Richman et al. ....................... 710/8 |
| 6,058,445 | * | 5/2000 | Chari et al. ......................... 710/103 |

* cited by examiner

Primary Examiner—Ayaz R. Sheikh
Assistant Examiner—Raymond N Phan
(74) Attorney, Agent, or Firm—Schnader Harrison Segal & Lewis LLP

(57) ABSTRACT

An IO controller device and method for controlling data flow, the method including determining a desired configuration for the IO controller, reprogramming the IO controller to allow for processing of one or more descriptor lists, modifying the configuration of the IO controller to reflect the addition or deletion of one or more virtual controllers, re-enumerating the IO controller, and processing a descriptor list for each of the IO controller and the one or more virtual controllers. The integrated circuit device for use as an IO controller includes a system bus interface, a programmable list processor and a port router. The integrated circuit device is adapted for reconfiguration to add or delete one or more virtual controllers. The virtual controllers provide substantially the full bandwidth supported by the integrated circuit device. The IO controller device and apparatus may be applied to personal computer systems, information appliances, set-top boxes, cable modems, game consoles, smart appliances, handheld computers, palm-sized computers, embedded control systems, workstations, servers and the like.

12 Claims, 4 Drawing Sheets

METHOD AND DEVICE FOR CONTROLLING DATA FLOW THROUGH AN IO CONTROLLER

This application is related to pending U.S. patent application Ser. No. 09/477,593 for "PORT ROUTER" by Aguilar et. al., filed Jan. 4, 2000, the disclosure of which is incorporated herein by reference. This application claims priority to U.S. Provisional Patent Applications Ser. Nos. 60/114,771 filed Jan. 5, 1999, 60/114,772 filed Jan. 5, 1999 and 60/114,767 filed Jan. 6, 1999, which are also incorporated herein by reference.

FIELD OF THE INVENTION

This invention relates to semi-conductor devices and, more particularly, to input/output (IO) controllers.

BACKGROUND OF THE INVENTION

IO controllers provide a connection between a computer operating system and an IO interface. Conventional operating systems create descriptor lists that form the instructions that an IO controller reads and follows in order to do its work. Current implementations of IO controllers include hardware circuits which read and initiate the operations defined in the descriptors. Any significant variation in the descriptor requires a new circuit, consequently rendering existing circuits obsolete. In practice, this creates the situation in which the development of new operating systems and the development of new hardware is delayed because the development of either requires coordination with the other.

The operational speed of an IO controller interface is typically fixed and the controller is limited to the bandwidth of the interface. The addition of another interface requires the addition of an add-on board or the redesign of a motherboard to accommodate a new controller interface device.

Attempts to increase the bandwidth of an IO device have required modification of the device hardware, precluding the dynamic addition of bandwidth. Modification or addition of hardware to a system has numerous disadvantages including reconfiguration expense, additional hardware expense and possible incompatibility with an existing operating system. Further, the addition of new hardware is performed while a system is turned off, requires a technician to install new hardware, and possibly requires a system administrator to change the operating system to support the new hardware. This process can be difficult, error prone and require expensive, time consuming design and re-qualification.

It is therefore desirable to have a device capable of accommodating the variation of a descriptor to add features, improve performance or provide forward or backward compatibility. Additionally, it is desirable to have a device which can be adapted to provide additional bandwidth by dynamically creating new instance of the IO controller in response to the requirements of a system without the addition of new hardware.

SUMMARY OF THE INVENTION

In one aspect of the invention, a method is provided for controlling data flow through an IO controller in a computer system. The method includes determining a desired configuration for the IO controller, reprogramming the IO controller to allow for processing of one or more descriptor lists, modifying the configuration of the IO controller to reflect the addition or deletion of one or more virtual controllers, re-enumerating the IO controller, and processing a descriptor list for each of the IO controller and the one or more virtual controllers. The one or more virtual controllers are discovered and initialized during the re-enumeration and are capable of providing the full bandwidth supported by the IO controller.

In another aspect, the invention is an integrated circuit device for use as an IO controller comprising a system bus interface, a programmable list processor and a port router. The integrated circuit device is adapted for reconfiguration to add or delete one or more virtual controllers. The virtual controllers provide substantially the full bandwidth supported by the integrated circuit device.

The invention may be used in a personal computer system, but can also be applied to other types of compute platforms, including but not limited to information appliances, set-top boxes, cable modems, game consoles, smart appliances, handheld computers, palm-sized computers, embedded control systems, workstations, servers and the like.

DETAILED DESCRIPTION OF THE INVENTION

The invention provides an apparatus and method for dynamically reconfiguring an IO device to accommodate changes in data flow protocol and/or host system interaction. The invention permits the addition (or deletion) of a virtual controller creating a new channel that an operating system can use to transfer data. The IO device can then provide dedicated throughput for peripheral devices that require high bandwidth, and can group several low bandwidth devices to produce to more efficient data transfer. The invention allows for the installation of a new operating program that can accommodate changes in an operating system, changes in system requirements, problems or bugs in devices, and changes in the data flow protocol.

The invention provides a practicable and cost effective solution for integrating additional internal circuitry into a compute platform (i.e. IO controllers). IO controllers create a bridge between an IO stream (bus, interface, network connection) and the operating system drivers in a host computer. The present invention provides a method and apparatus which use programmability to alter the operation of both the IO stream and the operating system interface sides of the bridge.

The invention may be applied to IO controllers including but not limited to USB, IEEE-1394, Fibre Channel, Infiniband and Ethernet. The apparatus and method of the invention can provide increased data flow between peripheral devices and a compute platform. This increased data flow is provided without the need for user intervention and allows for simple installation of complex devices to a compute platform. The invention may be used in a personal computer system, but can also be applied to other types of compute platforms, including but not limited to information appliances, set-top boxes, cable modems, game consoles, smart appliances, handheld computers, palm-sized computers, embedded control systems, workstations, servers and the like.

An IO controller according to the invention has a longer market life, permits rapid prototyping and implementing of fixes to bugs, accommodates errors in an operating system's descriptor lists, accommodates improvements in descriptor lists, and permits the incorporation of new types of descriptor operation. The invention reduces the number of different products needed to satisfy the requirements of a wide range of systems.

The representations of the FIGURES provided herewith are for purposes of illustration only and is not intended to limit the possible implementations of the invention. The number of ports and IO controllers present in a particular system or application may vary based on system requirements.

Figure 1:
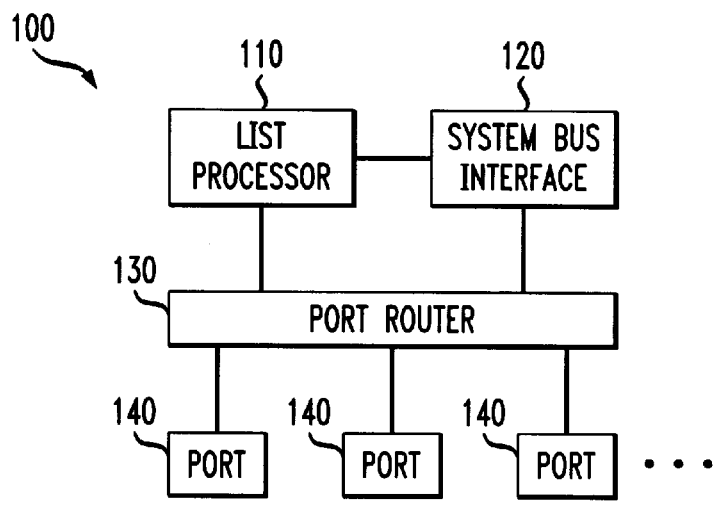
FIG. 1 is a block diagram of one embodiment of the invention.

In one embodiment of the invention, shown in FIG. 1, an integrated circuit (IC) device 100 for use as an IO controller is provided having a system bus interface 120, a programmable list processor 110, and a port router 130. The system bus interface 120, programmable list processor 110, and port router 130 are operatively connected. The port router 130 is also preferably connected to one or more interface ports 140.

By employing a programmable list processor 110, the IO controller can be reprogrammed or reconfigured to process multiple descriptor lists, unlike existing systems which are "single threaded" or capable of executing only a single descriptor list at one time. This functionality allows the IO controller according to the invention to act in the same manner as multiple discrete hardware controllers.

Figure 4:
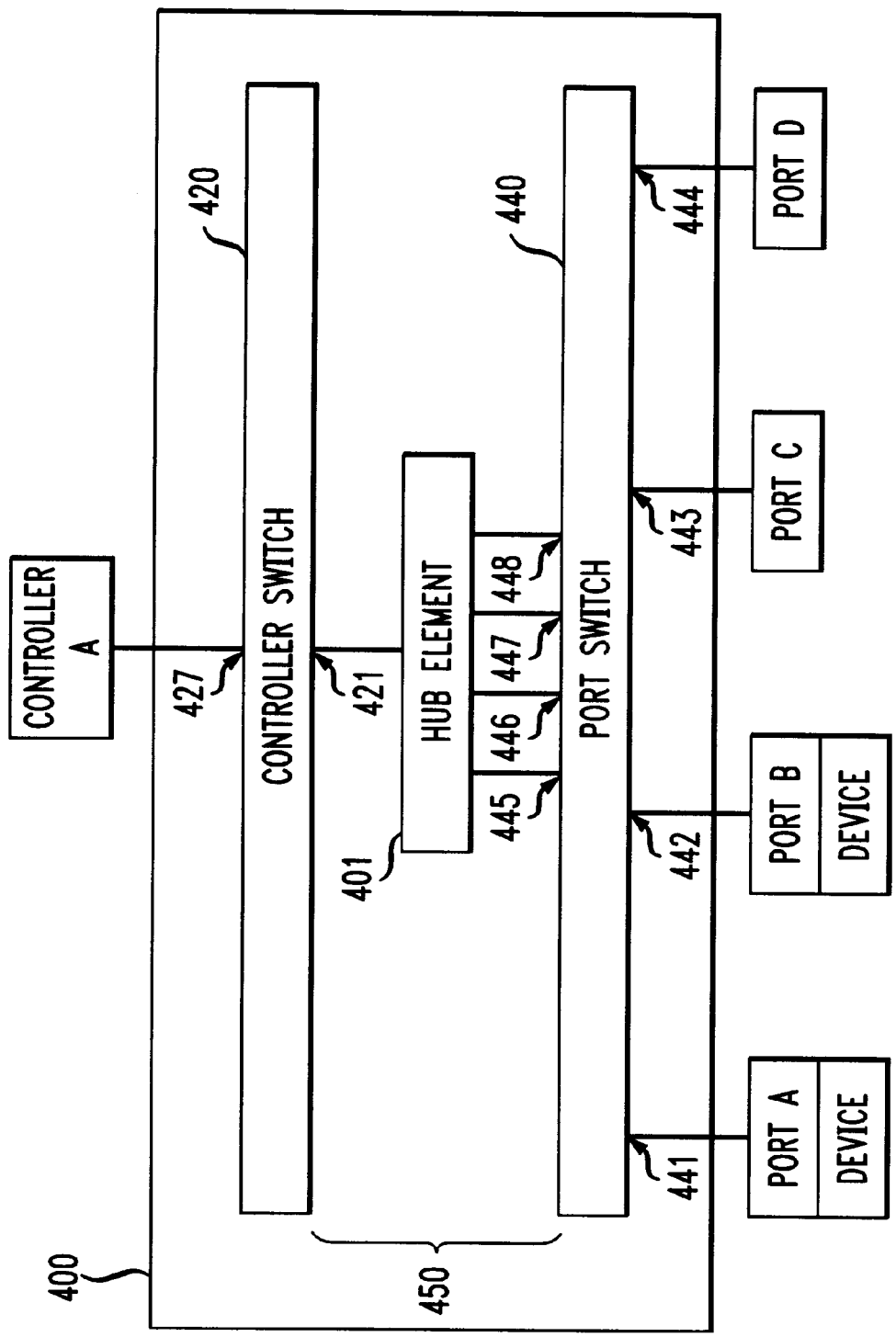
FIG. 4 is a block diagram illustrating one embodiment of a port router which can be used with the invention.

FIG. 4 is a block diagram illustrating one embodiment of a port router 400 which can be used with the invention. The port router 400 comprises a controller switch 420, a port switch 440 and connection(s) 450 between the controller switch 420 and port switch 440. Connection(s) 450 comprises a hub element 401. Port router 400 connects Ports A–D to a single controller, Controller A. The controller switch 420, the port switch 440 and the connection(s) 450 each have specific input and output capabilities. The port switch 440 has fixed inputs, 441–444, each connected to an interface port. The port switch 440 routes any port to one or more port switch outputs. The port switch 440 has a total number of outputs to support all routing elements. In the example of FIG. 4, the port switch 440 has four outputs for Hub element 401. The Hub element(s) preferably comply with the requirements of the IO interface for a given application. Each Hub element combines it's inputs and provides a single output that is input in the controller switch 420. Some IO interfaces refer to the Hub Element 401 as a bridge, a concentrator or a physical interface. Multiple Hub elements may be used to connect the port switch 440 to controller switch 420.

The controller switch 420 preferably has one input for each connection to a Hub element and one input for each direct connection (shown in FIG. 2) to the port switch 440. The outputs from the controller switch 420 are fixed to match the number of controllers that are necessary or available in a given application. As shown in FIG. 4, the controller switch has one input 421 connected to Hub element 401, and one output 427 connected to Controller A. It should be understood that the "inputs" and "outputs" described herein all refer to connections which can handle bi-directional data flow (commonly referred to as "input/outputs")

Figure 5:
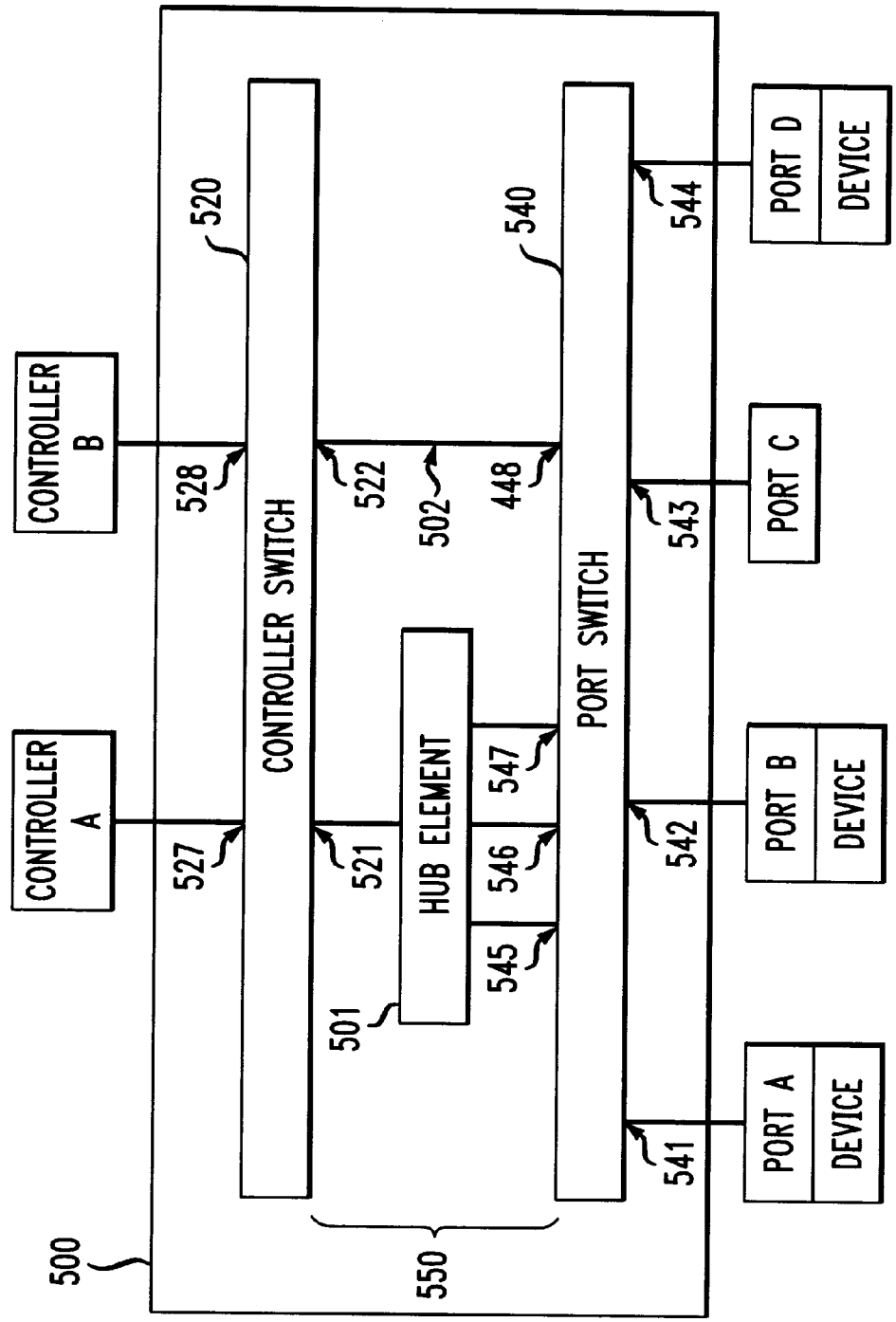
FIG. 5 is a block diagram illustrating another embodiment of a port router which can be used with the invention.

FIG. 5 illustrates the addition of a new device to Port D of the port router 400 of FIG. 4, where the bandwidth capacity for Controller A reaches a threshold. Controller B is added to the system and the connection of Port D through Hub element 201 is removed and a direct connection 502 is added. Upon insertion of a device into Port D, the device is detected and it's capacity requirements are reported. This capacity is calculated to be larger than the effective capacity of Controller A. A new controller B is added to the system, and the port router 100 is reconfigured to effect the connection of Ports A, B and C to Controller A and Port D only to Controller B. The connection for Port D to the hub element 501 is removed and a new direct connection 502 is created between the port switch 540 and the controller switch 520. The connection to Controller B is created from controller switch output 528. All data flow to and from Port D and the new device flows through this new connection from the port switch output 549 to the controller switch input 522. All data flow from Ports A, B and C continues to have the same routing from port switch outputs 545, 546 and 547 to hub element 501. In this configuration the data flow from Ports A, B and C are combined and delivered to the controller switch input 521.

In operation, the port switch 400 will preferably start in a default state with certain port inputs connected to a desired Controller. The example of FIG. 4 shows a system having a default state with four Ports, two devices connected to Ports A and B, one Hub Element 401, and one Controller A. Through a set of hardware registers (not shown) preferably resident in the port router 400, software operating in the system can query the port router 400 and discover the default topology. The system software can effect a change in routing of signals between any combination of Ports and Controllers by programming values in the hardware registers. During operation an event occurs. An event may be a new device being removed or inserted into a Port. This event triggers the software to examine the requirements of the new device. These requirements may include the device's data capacity requirements (bandwidth and latency) and its data style (asynchronous, isochronous, burst, stream). The new requirements are combined with the current set of requirements from devices already installed, and a new preferably optimized topology for routing the ports is computed. Preferably, the system software causes IO operations to suspend and effect the re-routing between the Ports and IO Controller(s). The system software then resumes IO operations and the optimized routing becomes the new routing until a new event occurs.

In another embodiment the port router 400 preferably contains embedded software which allows routing and re-routing to be effected internally without requiring the intervention of system software. This provides the ability for self-monitoring and dynamic load balancing based on the flow of data through the port router 400.

Figure 2:
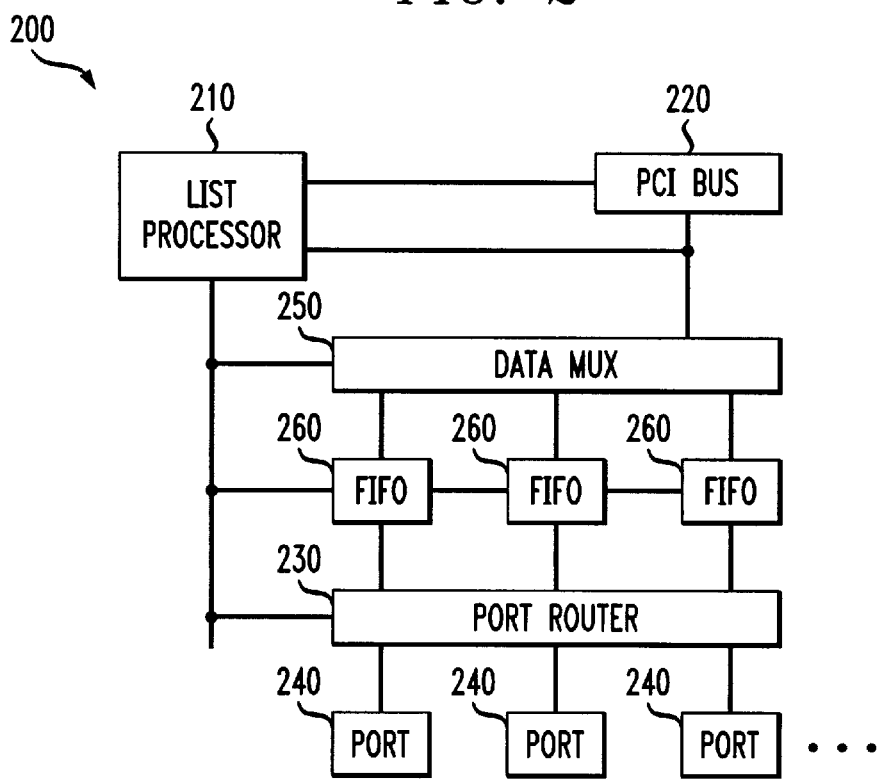
FIG. 2 is a block diagram of another embodiment of the invention.

In another embodiment of the invention, shown in FIG. 2, an integrated circuit (IC) device 200 for use as an IO controller is provided having a peripheral component interconnect (PCI) bus 220 as the system bus interface, a programmable list processor 210, a port router 230, a data mux 250, and a plurality of FIFO(first in first out) data buffers 260. One or more interface ports 240 are also preferably connected to the port router 230. Each of the elements are preferably operatively connected to allow data signals and control signals to be transmitted between the elements.

When data is received from the interface it preferably passes through a Port 240 and the Port Router 230 preferably directs it to a particular FIFO 260. When a data element is received in the FIFO 260, the List Processor 210 preferably examines it and determines its disposition. The actions taken on the data element depend on the protocol rules for the interface and will be different for example with Ethernet, USB, IEEE-1394 and the like. It is preferable that controlling software in the List Processor 210 is responsible for determining a desired configuration. The List Processor 210 preferably performs an action such as but not limited to: transmit the data element to system memory, cause a pending transaction to be completed, cause an error to be transmitted to the system, cause an error to be transmitted to the interface, prepare data for transmission to the interface. All data elements transmitted to and from system memory through the PCIbus 220 preferably pass through the Data Mux 250 element. When a data element is to be transmitted from system memory to the interface, it is preferably received through the PCIbus 220, passed through the data mux 250 and placed into the correct FIFO 260. The List Processor that initiated fetching the data from system memory preferably prepares it for transmission to the interface and monitors the conditions on the interface for the appropriate opportunity for data transmission. If the interface is non responsive or not operational the List Processor 210 preferably may take several actions: save data for later retransmission, report an error to the system, and the like.

The List Processor element 210 preferably has many characteristics of a general purpose compute engine such as a microprocessor or microcontroller with adaptations to perform the functions of controlling the flow of data between the Port and system bus. It executes software that preferably is fixed in ROM or that more preferably may be downloaded. The software is preferably written to reflect the manner in which the protocol on the interface is defined, typically following industry standards. It is preferred that the software can also be applied for private interface standards. If for example, the protocol requires that the system transmits a data element and receives an acknowledgment that the data was correctly received, the List Processor element has a software control structure that anticipates the receipt of the acknowledgment, if no acknowledgment is received then perhaps a re-transmission is initiated or an error is transmitted to the system. The exact action depends on the rules of the protocol definition.

The system bus 120 may also comprise other multi-master bus structures including but not limited to PCI-X, Infiniband, VMNEbus, HubLink, and the like. A common feature of these operating systems is an enumeration phase. During enumeration, the hardware present on a system bus is queried, the data describing the features of the hardware is created and acted upon by operating system software. The operating system used with the invention is preferably capable of performing re-enumeration if requested.

It is preferred that the invention has a default configuration that is reported during enumeration. In a preferred default state, the list processor 110 is programmed to process a single list and is configured to report a single 10 controller to the operating system. It is also preferred that the default state on start up is the state maintained from before the previous power down.

During operation the list processor 110 preferably functions to interpret and act upon the instructions of an operating system. A virtual controller may be created to allow the operating system to understand and act as if multiple instances of discrete IO controller hardware exist.

Modifying the hardware description of the IO controller and requesting that the operating system re-enumerate the IO controller allows the creation or deletion of one or more new virtual instance of the IO controller. The dynamic creation of a new IO controller can be performed multiple times, until practical limits (i.e. system bus bandwidth, IO controller number limits, etc) are reached.

Figure 3:
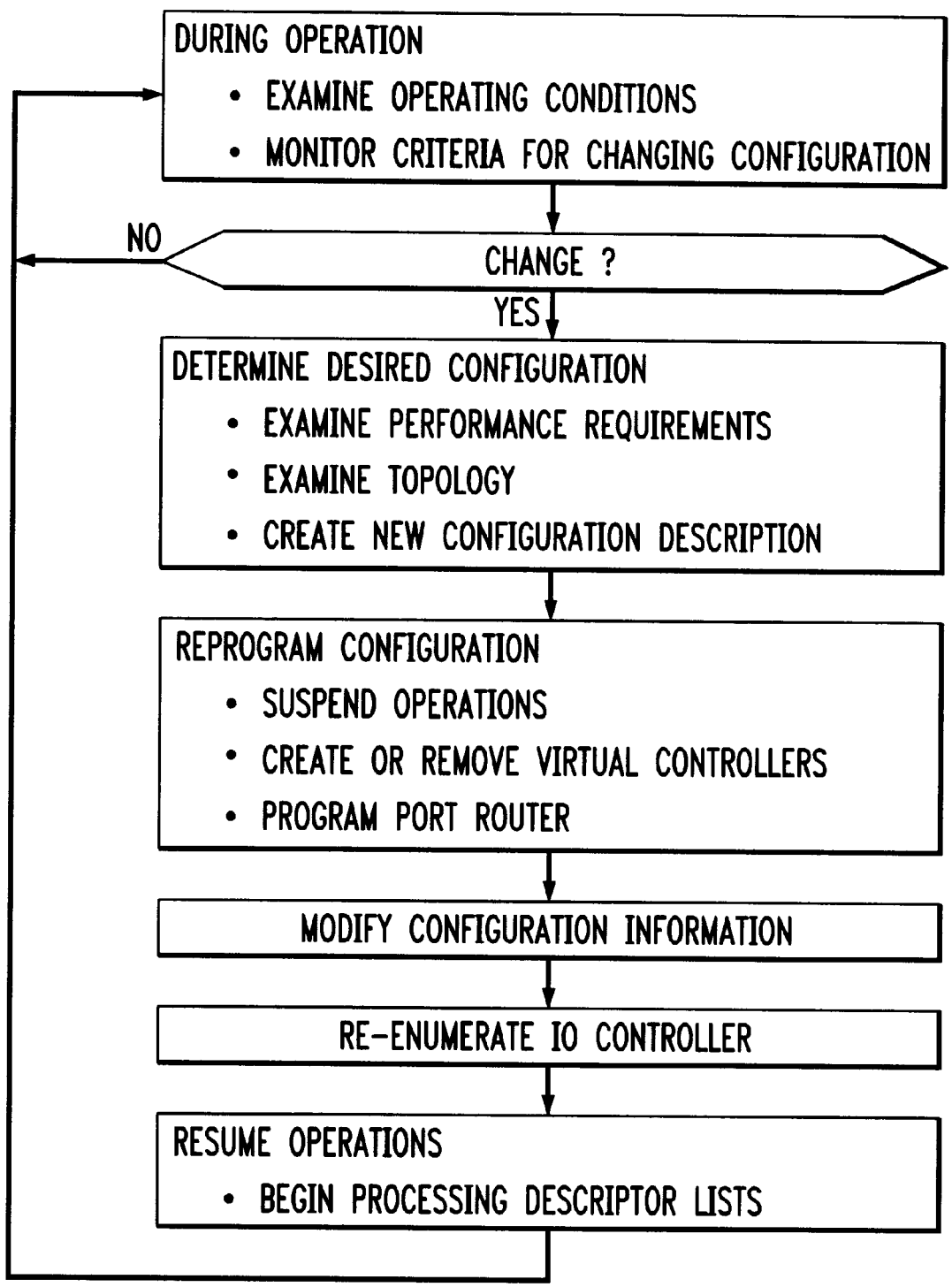
FIG. 3 is a flow diagram illustrating an embodiment of the method of the invention.

In one embodiment of the method of the invention illustrated in the flow diagram of FIG. 3, a determination is made that the current IO controller configuration should be modified. The determination may be made by the operating system or by a monitoring element (not shown) internal to the IO controller. The determination that the current IO controller configuration should be modified is preferably made based on the existence of one or more predetermined conditions including but not limited to increased or decreased data flow through the IO controller.

The determination is preferably based on a number of criteria including but not limited to: the total bandwidth requirements of peripheral devices, the bandwidth requirements of a particular peripheral, the latency requirements of a particular peripheral, the presence of conflicting peripherals, the topology of the peripherals, the addition or removal of a peripheral, the increase or decrease in the bandwidth requirements of an existing peripheral, the increase or decrease in the latency requirements of an existing peripheral, and the such.

The operation of the IO controller is then preferably temporarily suspended. The devices attached to the IO controller are suspended (or put to sleep) to stop the data flow. The list processor 110 is then preferably programmed to allow the processing of one or more new descriptor lists for each virtual controller added to the system. The descriptor list(s) previously in operation remain intact and are processed along with the new descriptor list(s) when operation resumes. The configuration of the IO controller is modified to reflect the addition or deletion of one or more virtual controllers. Preferably, the devices connected to the IO controller are re-routed to a desired configuration which provides efficient data paths thus optimizing or improving the data flow through the IO controller. This is typically accomplished by dividing the data flow between the one or more IO controllers.

After reconfiguration is complete, a request is made to the operating system to re-enumerate the IO controller. The virtual controllers are detected, and the operating system queries to discover which devices are connected to which controllers. Descriptor lists are created and the list processor 110 begins to process each descriptor list. The devices may then resume operation. Typically the devices are re-enumerated by the operating system.

Features of the list processor 110 include multi-threaded execution in which multiple descriptor lists may be operated on simultaneously. Typical operations which can be executed simultaneously by the list processor 110 include: fetching from system memory, caching (or fetching descriptors before they are needed to reduce multiple accesses to system memory), validation of the descriptor, preparation of IO hardware for data transfer, construction of data flow protocol elements, fetching or delivering of data from and to system memory, monitoring of data flow for exceptions, monitoring of data flow for completion, termination of descriptor, error processing and cleanup, and reporting results back to the operating system.

Thus, the method of controlling data flow through an IO controller in a computer system according to an embodiment of the invention comprises determining a desired configuration for the IO controller, reprogramming the IO controller to allow for processing of one or more descriptor lists, modifying the configuration of the IO controller to reflect the addition or deletion of one or more virtual controllers, re-enumerating the IO controller, and processing a descriptor list for each of the IO controller and the one or more virtual controllers. The one or more virtual controllers are preferably discovered and initialized during the reenumeration and preferably provide the full bandwidth supported by the IO controller and defined by the interface specification.

Modifying the configuration of the IO controller preferably includes creating one or more new configuration descriptors which indicate the presence of the one or more virtual controllers. Connections from the interface ports are preferably rerouted to a desired routing configuration which provides efficient data flow. Determining a desired configuration for the IO controller and modifying the configuration of the IO controller is preferably controlled by drivers in the computer system, or more preferably by firmware embedded in the IO controller. Determining a desired configuration for the IO controller preferably includes determining whether the existing configuration of the IO controller should be changed based on existing conditions and determining an optimized configuration for the IO controller based on the existing conditions.

The method of controlling data flow through an IO controller in a computer system according to another embodiment of the invention comprises entering a reconfiguration mode upon the existence of one or more predetermined conditions, determining a desired configuration for the IO controller, reprogramming the IO controller to allow for processing of one or more descriptor lists, modifying the configuration of the IO controller to reflect the addition or deletion of one or more virtual controllers, re-enumerating the IO controller, and processing a descriptor list for each of the IO controller and the one or more virtual controllers. Entering a reconfiguration mode preferably includes suspending operation of devices connected to the computer system. The predetermined conditions preferably include increased or decreased data flow through the IO controller.

In another aspect, the invention is an integrated circuit device for use as an IO controller comprising a system bus interface, a programmable list processor and a port router. The system bus interface, the programmable list processor and the port router are preferably operatively connected. The integrated circuit device is preferably adapted for reconfiguration to add or delete one or more virtual controllers, the virtual controllers providing substantially the full bandwidth supported by the integrated circuit device.

Although the invention has been described with reference to exemplary embodiments and accompanying drawings, it can be readily understood that the invention is not restricted to such embodiments and that various changes and modifications can be made by those skilled in the art without departing from the spirit and scope of the invention.

What is claimed is:

1. A method of controlling data flow through an IO controller from one or more port interfaces to internal circuitry of a computer system comprising:

determining a desired configuration for said IO controller;

reprogramming said IO controller to allow for processing of one or more descriptor lists;

modifying the configuration of said IO controller to reflect the addition or deletion of one or more virtual controllers;

re-enumerating said IO controller;

processing a descriptor list for each of said IO controller and said one or more virtual controllers; and wherein port interfaces support a maximum bandwidth, and said one or more virtual controllers are discovered and initialized during said re-enumeration and provide the maximum bandwidth supported by said port interfaces.

2. A method according to claim 1, wherein modifying the configuration of said IO controller includes creating one or more new configuration descriptors which indicate the presence of said one or more virtual controllers.

3. A method according to claim 1, further comprising re-routing connections to said IO controller to a desired routing configuration.

4. A method according to claim 1, wherein determining a desired configuration for said IO controller and modifying the configuration of said IO controller is controlled by drivers in said computer system.

5. A method according to claim 1, wherein determining a desired configuration for said IO controller and modifying the configuration of said IO controller is controlled by firmware embedded in said IO controller.

6. A method according to claim 1, wherein determining a desired configuration for said IO controller includes determining whether an existing configuration of said IO controller should be changed based on existing conditions and determining an optimized configuration for said IO controller based on said existing conditions.

7. A method of controlling data flow through an IO controller in a computer system comprising:

entering a reconfiguration mode upon the existence of one or more predetermined conditions;

determining a desired configuration for said IO controller;

reprogramming said IO controller to allow for processing of one or more descriptor lists;

modifying the configuration of said IO controller to reflect the addition or deletion of one or more virtual controllers;

re-enumerating said IO controller;

creating a descriptor list for each of said IO controller and said one or more virtual controllers; and wherein said predetermined conditions include increased or decreased data flow through said IO controller.

8. A method according to claim 7, wherein entering a reconfiguration mode includes suspending operation of devices connected to said computer system.

9. An integrated circuit device for use as an IO controller comprising:

a system bus interface;

a programmable list processor; and a port router;

wherein said system bus interface, said programmable list processor and said port router are operatively connected;

wherein said IO controller processes one or more descriptor lists;

said IO controller reflects the addition or deletion of one or more virtual controllers;

said IO controller is re-enumerated;

a descriptor list is processed for each of said IO controllers and said one or more virtual controllers; and wherein port interfaces support a maximum bandwidth, and said one or more virtual controllers are discovered and initialized during said re-enumeration and provide the maximum bandwidth supported by said port interfaces.

10. A method of controlling data flow through an IO controller from one or more port interfaces to internal circuitry of a computer system comprising:

determining a desired configuration for said IO controller;

reprogramming said IO controller to allow for processing of one or more descriptor lists;

modifying the configuration of said IO controller to reflect the addition or deletion of one or more virtual controllers;

re-enumerating said IO controller;

processing a descriptor list for each of said IO controller and said one or more virtual controllers; and wherein one or more port interfaces support a maximum bandwidth, and said one or more virtual controllers are discovered during said re-enumeration and provide the maximum bandwidth supported by said one or more port interfaces.

11. A method according to claim 1, wherein said one or more virtual controllers are initialized during said re-enumeration after being discovered.

12. An integrated circuit device for use as an IO controller comprising:

a system bus interface;

a programmable list processor; and a port router;

wherein said system bus interface, said programmable list processor and said port router are operatively connected;

wherein said IO controller processes one or more descriptor lists;

said IO controller reflects the addition or deletion of one or more virtual controllers;

said IO controller is re-enumerated;

a descriptor list is processed for each of said IO controllers and said one or more virtual controllers; and wherein one or more port interfaces support a maximum bandwidth, and said one or more virtual controllers are discovered during said re-enumeration and provide the maximum bandwidth supported by said one or more port interfaces.

* * * * *